(12) United States Patent
Green et al.

(10) Patent No.: US 8,862,310 B2
(45) Date of Patent: Oct. 14, 2014

(54) DETERMINING ROTORCRAFT COLLECTIVE ADJUSTMENT DURING GROUND TEST

(75) Inventors: David L. Green, Davidson, NC (US);
Harrison H. Chin, Newton, MA (US);
Howard S. Kunselman, Huntsville, AL (US)

(73) Assignee: Simmonds Precision Products, Inc., Vergennes, VT (US)

( * ) Notice: Subject to any disclaimer, the term of this patent is extended or adjusted under 35 U.S.C. 154(b) by 156 days.

(21) Appl. No.: 13/490,229

(22) Filed: Jun. 6, 2012

(65) Prior Publication Data
US 2013/0332022 A1    Dec. 12, 2013

(51) Int. Cl.
*B64F 5/00*    (2006.01)

(52) U.S. Cl.
USPC .......................................... 701/29.1; 702/183

(58) Field of Classification Search
USPC .......................................... 701/29.1; 702/183
See application file for complete search history.

*Primary Examiner* — Mary Cheung
*Assistant Examiner* — Brian P Sweeney
(74) *Attorney, Agent, or Firm* — Edwards Wildman Palmer LLP; Scott D. Wofsy; Adam P. Daniels

(57) ABSTRACT

A method for evaluating a collective alignment of rotor blades for an aircraft while the aircraft is on the ground is disclosed. The method includes determining an air density altitude, and determining a torque value for each engine of the aircraft, while the aircraft rotor blades are operated at a normal speed and the rotor blades are set to a full down position for ground operations via a collective controller. The method further includes evaluating the collective condition by comparing the torque value to a predetermined flat pitch torque alignment limit for the air density altitude, and providing an indication of the collective condition.

8 Claims, 7 Drawing Sheets

DETERMINING ROTORCRAFT COLLECTIVE ADJUSTMENT DURING GROUND TEST

BACKGROUND OF THE INVENTION

1. Field of the Invention

The present invention relates to improving rotary aircraft maintenance, and more particularly, to systems and methods for evaluating aircraft rotor blade alignment, collectively.

2. Background

Conventional rotary aircraft include a collective controller that allows a pilot to collectively increase or decrease a pitch angle for main rotor blades. This collective controller changes the pitch angle, i.e., blade angle, of all the main rotor blades by a uniform amount at the same time. When the blade angle collectively changes, the total lift derived from the main rotor increases or decreases. In level flight this causes the aircraft to climb or descend, and, when the aircraft is pitched forward, the aircraft will accelerate or decelerate.

Maintenance on various rotary aircraft components is performed throughout the lifespan of the aircraft and results in various adjustments that affect the alignment of individual main rotor blades, e.g., minimizing rotor blade vibrations. These adjustments can include an adjustment to weight, blade angle, blade tabs, pitch rods and rigging of collective control. The total impact of these adjustments can affect the alignment of the rotor blades, which, in turn can result in degraded or unsafe aircraft performance.

In order to monitor the impact of these adjustments and determine if the pitch angle of the rotor blades is within an acceptable alignment tolerance, a special flight test is conducted to determine the rotor speed measured as rotations per minute for the main rotor blades. For example, this special flight test involves an auto-rotative flight, e.g., un-powered flight, while maintaining a steady heading, stabilized at a specified airspeed (e.g., the airspeed slightly above an airspeed for minimum descent) indicated airspeed with the collective controller positioned to adjust each rotor blade to a flat pitch angle. During flight, pilots monitor and measure parameters such as main rotor blade rotations per minute (RPM), outside air temperature, pressure altitude and fuel weight. From these parameters, the aircraft gross weight and air density altitude are calculated. The pilots then determine if the rotor blades are in proper alignment according to a chart with prescribed tolerances according to aircraft gross weight, and by comparing an indicated rotor speed (RPM) to the air density altitude (feet). As can be readily appreciated by those skilled in the art, this special flight test is expensive, time-consuming, complex, depends on ambient air conditions (e.g., turbulence), and pilot skill.

Therefore, there is a need for systems and methods which can evaluate a collective condition of aircraft rotor blades (e.g., alignment of aircraft rotor blades), while the aircraft is on the ground, so as to eliminate the need for a special flight test.

SUMMARY

The present disclosure provides systems and methods for evaluating a collective aircraft rotor blade condition (e.g. an alignment condition/an adjustment condition). The disclosed systems and methods provide processes, devices and processing architecture to evaluate the collective rotor blade adjustment.

The terms "comprises" or "comprising" are to be interpreted as specifying the presence of the stated features, integers, steps or components, but not precluding the presence of one or more other features, integers, steps or components or groups thereof.

In particular, the present disclosure provides a method for evaluating a collective adjustment condition of aircraft rotor blades, while the aircraft is on the ground. The method includes determining an air density altitude, and determining a torque value for each engine of the aircraft, while the aircraft rotor blades are operated at a normal speed and the rotor blades are set to a full down position via a collective controller. The method further includes evaluating the collective condition by comparing the torque value to a predetermined flat pitch torque alignment limit for the air density altitude, and providing an indication of the collective condition.

It is envisioned that at least one predetermined flat pitch torque alignment for the air density altitude can include a high torque limit, and the step of evaluating the collective condition can further include steps such as determining a density ratio for the air density altitude, and determining the high alignment by multiplying the density ratio by about 22. The step of providing an indication of the collective condition can further include providing an indication of the collective condition based on a comparison of the torque value to the high torque limit. For example, if the determined torque value is above the high torque limit, the collective condition indicates a high collective blade pitch, or, in contrast, if the determined torque value is below the high torque limit, the collective condition indicates a proper collective blade pitch.

Conversely, it is also envisioned that at least one predetermined flat pitch torque alignment for the air density altitude can include a low torque limit. For embodiments having a low torque limit, the step of evaluating the collective condition can further include steps such as determining a density ratio for the air density altitude, and determining the low torque limit by multiplying the density ratio by about 17. The step of providing the indication of the collective condition can further include providing the indication of the collective condition based on a comparison of the torque values to the low torque limit.

With respect to providing the indication of the collective condition, in some embodiments, this step can include displaying the collective condition on an aircraft display provided in an aircraft cockpit. In this fashion, the pilot can visually see an indication of collective condition from cockpit displays such as a Heads Up Display (HUD), or a multi-function display (MFD).

In some embodiments, an aircraft pedal controller can transfer torque to a tail rotor, and, thus, the pedal position can influence an indication main rotor blade torque. In these embodiments, the method may further include measuring a neutral aircraft pedal controller position for an aircraft pedal controller, prior to the step of evaluating the collective condition.

In addition, it is envisioned that the torque value can be normalized to a standard sea level based on an air density ratio. In these embodiments, the method further includes determining an outside air temperature for the aircraft, determining an air density ratio based, at least in part, on the outside air temperature, and normalizing the torque value to the standard sea level based on the air density ratio.

In some embodiments, the present disclosure provides a method for evaluating a collective alignment of aircraft rotor blades and includes determining a collective condition for an aircraft, via an auto-rotative test flight, determining a first engine torque value for the aircraft while the aircraft is on the ground and the aircraft rotor blades are at a normal speed. The method further includes associating the first engine torque value with the collective condition, determining a second engine torque value for the aircraft, while the aircraft is on the ground and the aircraft rotor blades are operated at a normal speed, and providing an indication of the collective condition if the engine torque value matches the first torque value. The indication of the collective alignment can, at times, be a proper collective condition or an improper collective condition.

In other embodiments, the present disclosure further provides a device for evaluating the collective alignment of aircraft rotor blades, while the aircraft is on the ground. The device includes a processor, a memory that contains instructions, which are readable by the processor and enable the processor to perform the methods such as those discussed both above and throughout this disclosure.

For example, the instructions, which are readable by the processor, can cause the processor to determine an air density altitude based on a location of the aircraft, determine a torque value for each engine of the aircraft while the aircraft rotor blades are operated at a normal speed and a collective controller of the aircraft is set to a flat pitch angle, evaluate the collective condition of the aircraft rotor blades by comparing the torque value to at least one predetermined flat pitch torque alignment limit for the air density altitude; and provide an indication of the collective condition.

Still further, in other embodiments, the present disclosure provides a non-transitory storage medium comprising instructions that are readable by a processor and cause the processor to determine an air density altitude for an aircraft on the ground, determine a torque value for each engine of the aircraft, while rotor blades of the aircraft are operated at a normal speed and set to full down (e.g., a minimum collective control setting for ground operations), via a collective controller. The instructions further cause the processor to evaluate a collective condition based on the torque value and the air density altitude, and provide an indication of the collective alignment condition.

Notably, as used herein a "collective condition" can refer to an alignment condition and/or an adjustment condition for all of the main rotor blades.

BRIEF DESCRIPTION OF THE DRAWINGS

So that those having ordinary skill in the art can more readily understand how to employ the novel systems and methods of the present disclosure, embodiments thereof are described in detail herein below with reference to the figures, wherein.

In general, a component or a feature that is common to more than one drawing is indicated with the same reference number in each of the drawings.

DETAILED DESCRIPTION

Disclosed herein are detailed descriptions of specific embodiments of the devices, systems and methods of the present invention. It will be understood that the disclosed embodiments are merely examples of the way in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figures illustrating the components show some mechanical elements that are known and will be recognized by one skilled in the art. The detailed descriptions of such elements are not necessary to an understanding of the invention, and accordingly, are herein presented only to the degree necessary to facilitate an understanding of the novel features of the present invention.

Figure 1:
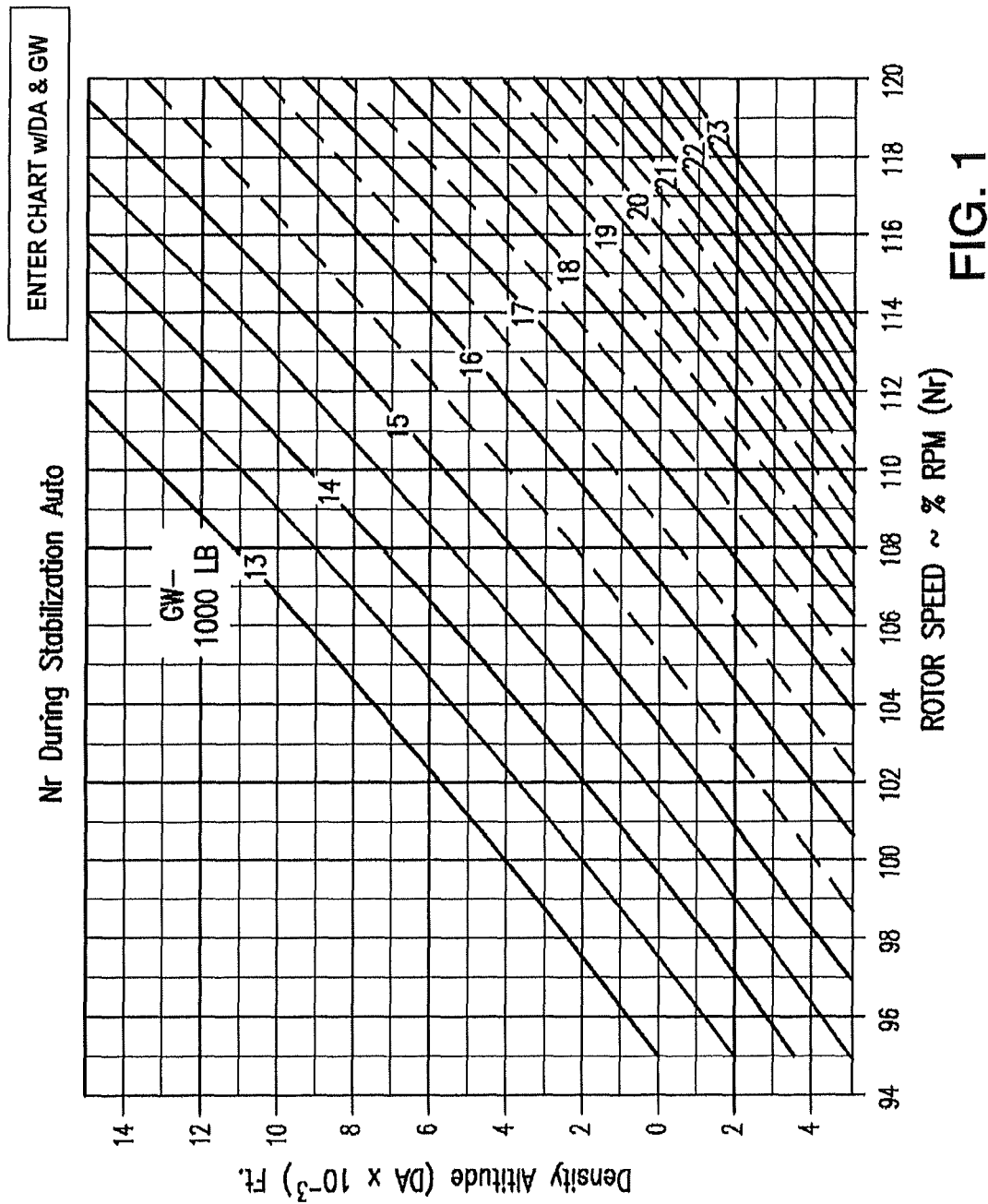
FIG. 1 is a graphical representation that illustrates a relationship between an ideal rotor speed (Nr) and combinations of density altitude (DA) and gross weight (GW) during stabilized auto-rotative flight.

Referring to FIG. 1, the relationship between an ideal rotor speed (Nr) and air density altitude is illustrated according to gross weight during stabilized auto-rotative flight. As discussed above, using traditional special auto-rotative flight methods, pilots fly an aircraft to a given altitude and perform an auto-rotative flight test. During this auto-rotative flight test, the pilots check the auto-rotative RPM against the density altitude and gross weight. The pilots further identify an appropriate gross weight curve indicated in FIG. 1, to determine if the aircraft rotor blades are in proper collective alignment. For example, for an aircraft having a gross weight of 17,000 lbs., an air density altitude of 3000 ft, the ideal rotor blade RPM is 113% as compared to the manufacturers' ideal RPM limit. Typically, if a RPM (NR) for aircraft gross weight line is outside +/−3% of the ideal rotor blade RPM specified in FIG. 1, the collective rotor blade alignment or adjustment is considered to be out of tolerance or misaligned and, ultimately, requires collective rigging adjustment.

The systems and methods provided by the present disclosure are illustrated in FIGS. 2-7. The systems and methods disclosed are not limited to a particular aircraft or aircraft configuration, but, instead, can be employed for a variety of aircraft and aircraft configurations, including single and dual main rotor blade aircraft and single or dual engine aircrafts, without departing from the inventive aspects of the present disclosure.

Figure 2:
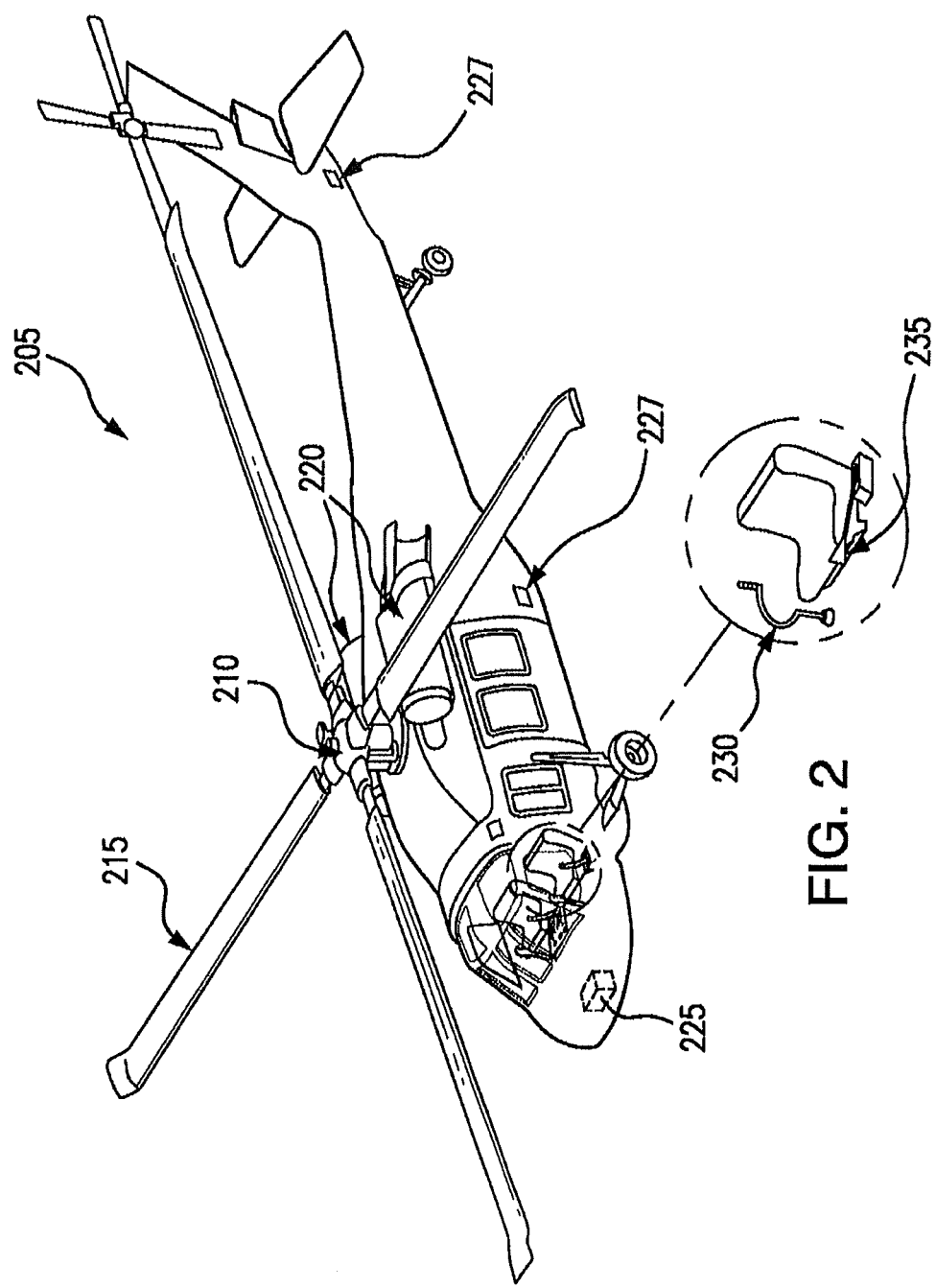
FIG. 2 is a perspective view of a typical rotary aircraft, which illustrates components of an aircraft rotor blade alignment system.

FIG. 2 provides a perspective view of a typical rotary aircraft, i.e., aircraft 205, which illustrates components of an aircraft rotor blade alignment system that employs a system for evaluating collective alignment of main rotor blades, while the aircraft is on the ground.

In particular, rotary aircraft 205 includes, among other components, two engines 220, a single main rotor shaft 210, four main rotor blades 215, two controllers, i.e., a cyclic controller 230 and a collective controller 235, a Health and Usage Maintenance System (HUMS) 225, and various sensors 227.

Collective controller 235, as discussed above, collectively increases or decreases all of the blade angle for each of main rotor blades 215 by an identical amount simultaneously. When the pitch angle for all main rotor blades is collectively changed, the total lift for the aircraft increases or decreases. As stated previously, in level flight this causes the aircraft to climb or descend, and, when the aircraft is pitched forward, the aircraft will accelerate or decelerate.

In one embodiment, HUMS 225 evaluates a collective alignment of the main rotor blades. However, as appreciated by those skilled in the art, evaluating the collective alignment is not limited to being employed by HUMS 225, but, instead can be a stand alone system, independent of HUMS 225.

HUMS 225 acquires, analyzes, communicates and stores data gathered from sensors, e.g., sensors 227, and monitors aircraft components for safe flight. Although HUMS 225 is represented as a box within the cockpit of aircraft 205 for purposes of simplicity, it is not limited to such. HUMS 225 can include any number of sensors, processors, data aggregators, and routers positioned proximate to aircraft 205. HUMS 225 can acquire, analyze, communicate, and store data such as, but not limited to: accelerations, vibrations, pressure altitude, engine and gearbox performance, auxiliary power unit usage, outside air temperatures (OAT), engine torque(s) (Q), and rotor speed (RPM).

As used throughout this disclosure, engine torque (Q) refers a measure of torque on the engine output shaft. The output shaft is subsequently connected to an aircraft transmission system that provides power to main rotor shaft 210, which turns rotor blades 215. The engine torque (Q) is typically measured by engine systems such as a Full Authority Digital Engine Control system and then transmitted to HUMS 225. The engine torque (Q) is typically represented as a percentage of the engine torque limit established by the engine manufacturer.

The inventors of the present application have identified a relationship between proper alignment of the aircraft rotor blades and the aircraft engine torque under certain operation conditions. This relationship is used in the systems and methods of the present disclosure, which evaluate the collective alignment of the rotorcraft's main rotor blades, without a need for the traditional auto-rotative special flight test.

Figure 3:
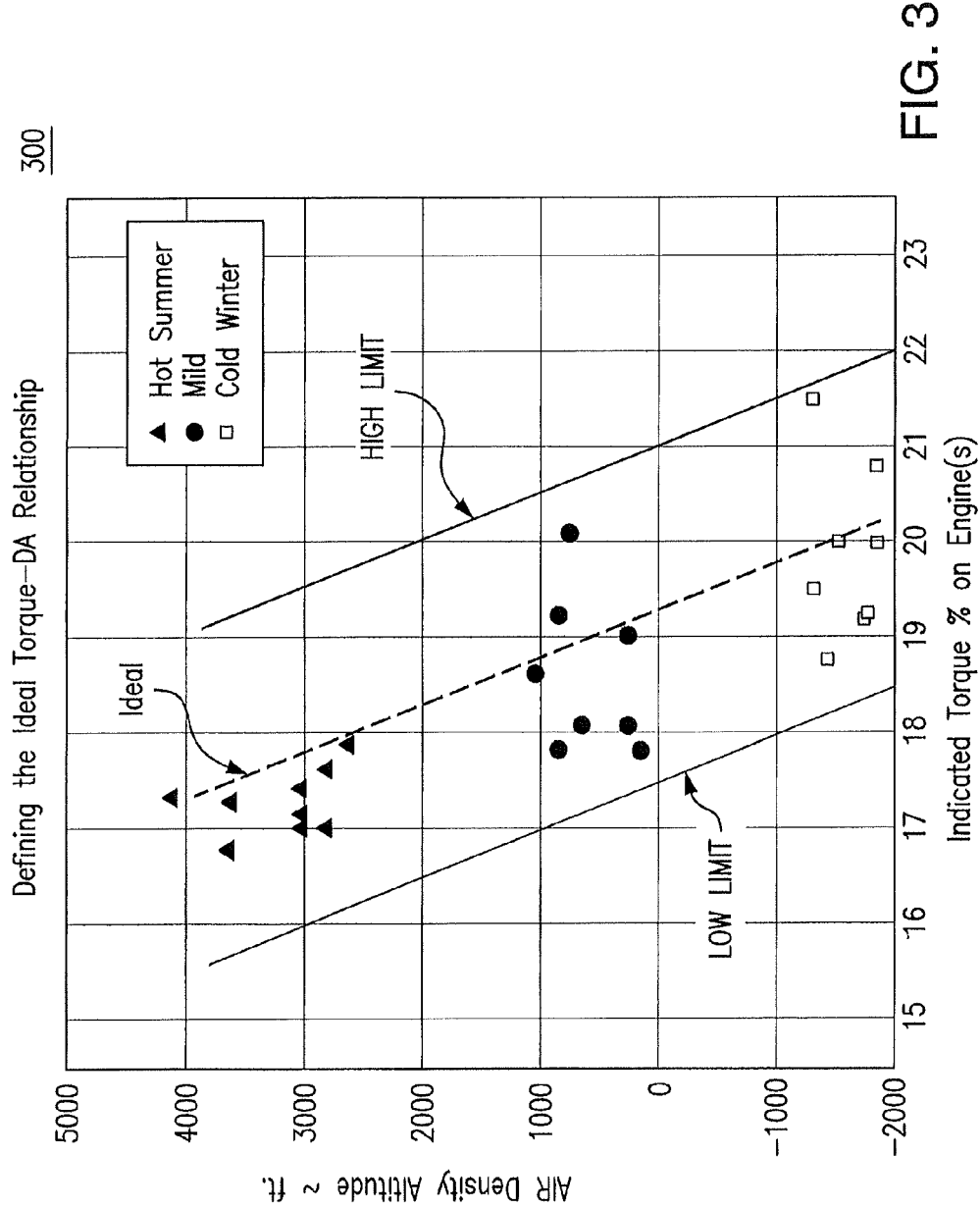
FIG. 3 is a graphical representation that defines an ideal torque-air density altitude relationship.

Referring now to FIG. 3, which provides a diagram 300 that illustrates an ideal torque %-air density altitude relationship. Diagram 300 illustrates a condensed version of a total amount of data collected to facilitate and simplify discussion of the relationship between torque, air density altitude, and the main rotor blade alignment. The total amount of data included iterative measurements taken from over 30 aircraft collected over a year time period for both proper and improper collective conditions. Throughout this time period the various aircraft were subjected to periodic special flight testing to ensure proper aircraft performance and periodic maintenance, which included properly aligning the collective rotor blade pitch angles.

Data points and threshold limits (including an ideal) illustrated in FIG. 3 are not to be construed so as to limit the scope of the present disclosure. For example, the threshold limits appear to be a straight line due to air density altitude scaling from −2,000 feet to 5,000 feet, while the threshold limits in FIG. 4 appear to have a slight curvature to air density altitude scaling from −4,000 feet to 10,000 feet. Moreover, while some of the test data represented results for a particular aircraft frame, i.e., a UH-60, the methodology discussed herein can be applied to multiple aircraft frames, including aircraft having engines in excess of 3, e.g., a CH-53 Sea Stallion, and dual main rotor shafts, e.g., a CH-47 Chinook.

Diagram 300 illustrates threshold limits such as a high torque limit, a low torque limit, and an ideal line. Diagram 300, as discussed above, provides a condensed a set of test data points for numerous aircraft tested at different air density altitudes, which vary according to weather conditions such as a hot summer (triangle), a mild weather day (circle), and a cold winter day (square).

Threshold limits are flat pitch torque alignment limits established from torque measurements when a collective controller, e.g., collective controller 235, is placed in a flat pitch position while the aircraft is on the ground. For example, the ideal, high and low threshold limits are established through an iterative process that is typically conducted as follows: While the aircraft is on the ground, the rotor blades are adjusted to a normal speed (99% Nr to 102% Nr), the collective controller is placed in a "full down" position, the engine torque(s), the outside air temperature, and the pressure altitude are measured and recorded. The air density altitude for each engine torque measurement is determined based on the outside air temperature and the pressure altitude. The engine torque measurements are further normalized to a Standard Sea Level, e.g., air density altitude equal to zero.

Each engine torque measurement, which is normalized to a Standard Sea Level, is further associated with proper or improper collective alignment for statistical analysis. That is, the aircraft is further determined to have either a proper or improper collective alignment, via any means available (e.g., the auto-rotative special flight test discussed above). Determining a proper or improper collective condition can be conducted at anytime, e.g., prior or post measuring and recording the torque on the engines.

Statistical analysis for all the normalized torque measurements associated with proper alignment yield a mean, a variance, and a standard deviation. Statistical analysis of the normalized torque measurements associated with improper alignment is then compared against the proper alignment data (including the mean and standard deviation) to determine threshold limits, e.g., ideal, high and low thresholds. That is, the improper alignment measurements serve to limit the number of orders of deviation from the proper normalized mean that are within an acceptable or proper collective condition.

In other embodiments, the above-discussed process does not require normalizing the torque measurements to a Standard Sea Level. Instead the torque measurements are merely associated with a current air density altitude. This process can be repeated for any number of air density altitudes to establish threshold limits for the numerous air density altitudes. A statistical analysis for the compilation of each threshold limit according to each air density altitude can yield the same threshold limit lines provided in diagram 300.

As discussed above, the data for determining threshold limits includes engine torque data, the outside air temperature data, and the pressure altitude data. To determine each data sample, the engine torque, the outside air temperature, the pressure altitude, and an accurate assessment of gross weight are typically measured for a period of time, e.g., 6-10 seconds, and averaged to minimize scatter due to additional ambient factors, discussed in greater detail below.

To normalize the engine torque for the Standard Sea Level, each engine torque measurement is divided by an air density ratio or sigma ($\sigma$) measured at the time the particular torque measurement was taken, or simply: $Q_{Standard\ Sea\ Level} = ((Q_{at\ \sigma})/\sigma)$. The air density ratio or sigma ($\sigma$) is determined as a function of the air temperature, i.e., outside air temperature, and pressure altitude as follows:

$$\sigma = \left(\frac{288.16}{(T+273.15)}\right) \times \left[1 - \left(\frac{0.001981 \times h_p}{288.16}\right)\right]^{5.256}$$

where:
σ=Air Density Ratio
T=Air Temperature in degrees C.
$h_p$=Pressure Altitude in Feet A mean value and a standard deviation are determined for this normalized engine torque data. This mean value, as discussed above, is equated to an "Ideal Q" value. For example, according to the data collected for a UH-60 aircraft, a mean normalized engine torque value was determined to be 19.45% engine torque and equated to an "Ideal Q". Further, nearly all of the data collected fell within two standard deviations, or between 17.7% engine torque and 21.2% engine torque, which served to as a basis for a low and high normalized threshold engine torque value, respectively. Selecting an appropriate order of deviation, here two orders, to serve as threshold limits was further validated from engine torque values measured by aircraft having improper collective blade alignment. Testing indicated that aircraft having improper collective blade alignment began at close to, but outside two standards of deviation.

Factors that can influence the engine torque value include, but are not limited to: number of engines, wind speed, and pedal controller position. For the data analyzed and collected, the aircraft included a two engine configuration, e.g., a UH-60, the wind speed measured less than 7 knots, and the pedal controller position was neutral, e.g., between 45% and 60% from full left. However, these factors can be accounted. For example, for a dual engine aircraft operating with having a single engine, the measured engine torque can be divided by a factor of two (2), or, alternatively, the threshold limits can be multiplied by the factor of 2. The engine torque data can also be weighted to account for wind conditions. Similarly, the engine torque data can be weighted to account for pedal controller positions that cause engine torque transfer to the tail rotor, or, alternatively, the process may require that the pedal controller be placed in a neutral position.

The normalized engine torque values, such as the ideal engine torque value of 19.4%, the low engine torque value of 17.7%, and the high engine torque value of 21.2%, are further extrapolated to determine the low engine torque limit, the high engine torque limit and the ideal engine torque values for various air density altitudes, illustrated in diagram 300. As is appreciated by those skilled in the art the air density altitude varies as a function of the air density ratio, e.g., sigma (σ), as follows:

$$h_d = \left(\frac{288.16}{0.001981}\right) \times (1 - \sigma^{0.235})$$

Where:
$h_d$ is the air density altitude; and
σ is the air density ratio.

Thus, for any given air density altitude, an air density ratio can be calculated. From this relationship, a lookup table such as Table 1 can be determined. In particular, table 1 illustrates particular air density altitudes, i.e., H (Geo-potential Altitude) and a corresponding air density ratio, i.e., σ.

As is further appreciated by those skilled in the art, engine torque varies as a function of the air density ratio, i.e., sigma (σ). Thus, for any given air density altitude (or for any given sigma), the normalized ideal engine torque, the high engine torque limit and the low engine torque limit can be extrapolated by multiplying the air density ratio by the desired normalized value. For example, using Table 1, a high engine torque limit for an air density of 5,000 feet can be calculated as follows:

(σ at 5,000 feet)×High Torque limit for Standard Sea Level 0.86166×21.2%=18.27% Q.

Accordingly, referring again to diagram 300, the ideal engine torque and thresholds, e.g., low engine torque limit and high engine torque limit, can be determined for any air density. Diagram 300 provides the ideal engine torque and thresholds limit lines based on the above-discussed limits for a UH-60 aircraft having a normalized low engine torque limit of 17.7% and a high engine torque limit of 21.2%.

According to test data collected and actual flight testing the aircraft, the 21.2% high engine torque limit and the 17.7% low engine torque limit corresponds to when an aircraft approaches a low Nr threshold for auto-rotations, and when an aircraft cannot command full power at a maximum horizontal velocity for normal rated power in level flight (Vh), respectively. That is, when engine torque exceeds about 21.2%, the aircraft produces a stabilized rotor speed below the lower limit prescribed by the special auto-rotative flight test methodology (ref. FIG. 1) and, when flat pitch engine torque is below about 17.7%, the pilot cannot command full power at Vh. For example, test data indicated that an aircraft having a flat pitch engine torque value of 16.5% at a 1,400 foot air density was misaligned and, accordingly, a subsequent flight test for this aircraft validated that the pilot was unable to command full power at Vh. A follow up adjustment to the collective main rotor blades resulted in an increased flat pitch engine torque value of 18.2% at 1,400 feet air density altitude. A subsequent flight test verified that the pilot could command full power at Vh and, further, the auto rotative RPM was within appropriate limits for the adjusted engine torque value. Similar tests were conducted to verify the high engine torque limit. For example, to verify the high engine torque limit, the special auto-rotative flight test was conducted for an aircraft having an original engine torque value greater than the high engine torque limit and yielded a lower auto-rotative rotor speed limit prescribed by the special flight test methodology. Subsequently an adjustment was collectively made to the collective pitch angle of the rotor blades, which caused the measured engine torque value to be below the high engine torque limit (but above the lower limit) for a given air density altitude. A follow-up auto-rotative flight test verified that, when within the threshold limits, the auto-rotative rotor RPM was within the prescribed limits.

As is appreciated by those skilled in the art, the 21.2% high engine torque limit and the 17.7% low engine torque limit are not absolute and can be adjusted according to the above-discussed iterative testing. In this fashion, these limits can be expanded to, for example, 17% engine torque and 22% engine torque.

Figure 4:
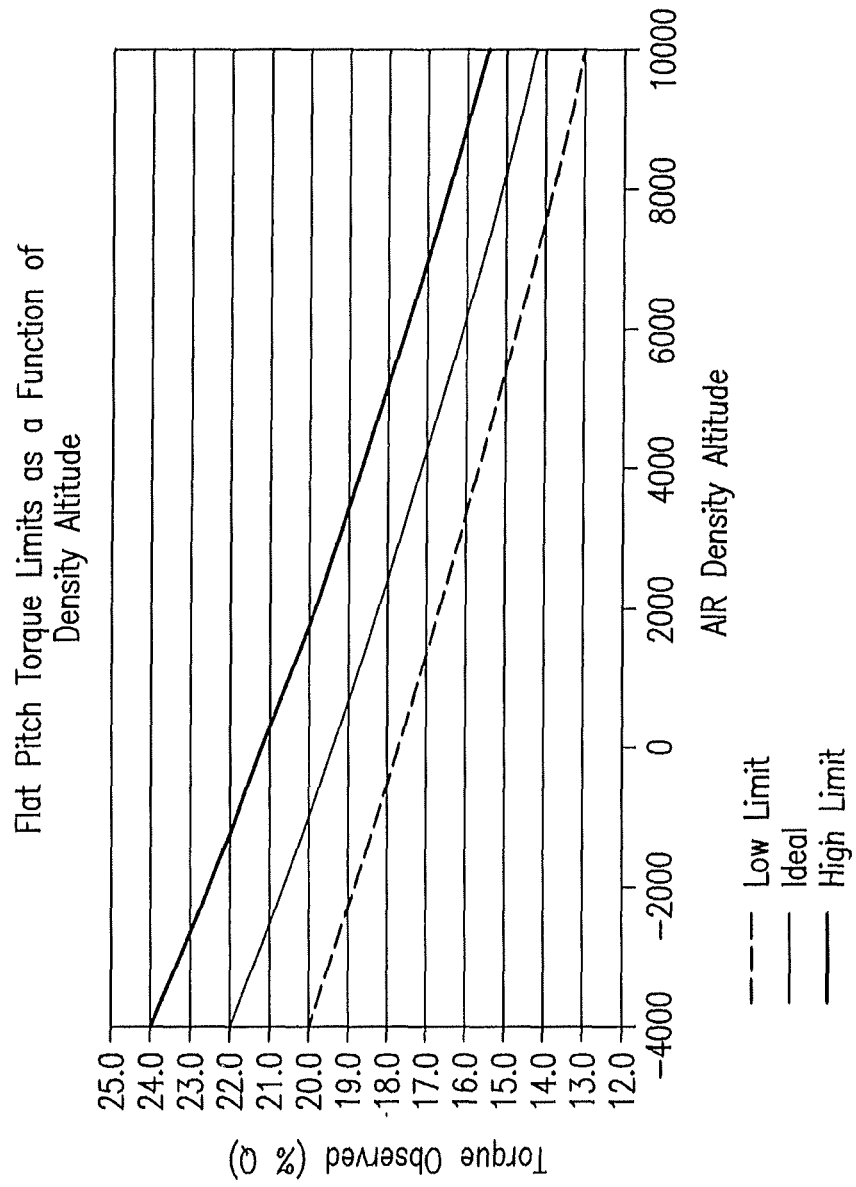
FIG. 4 is a graphical representation of flat pitch torque limits as a function of air density altitude.

Referring now to FIG. 4, which provides a diagram, i.e., diagram 400, that graphically illustrates a larger scale of air density altitudes, i.e., −4,000-10,000 feet, and corresponding high engine torque limit, a low engine torque limit, and an ideal engine torque value. Pilots or other aircraft crew can use diagram 400 when it is desirable to conduct manual alignment monitoring according to engine torque values and air density altitudes.

Figure 5:
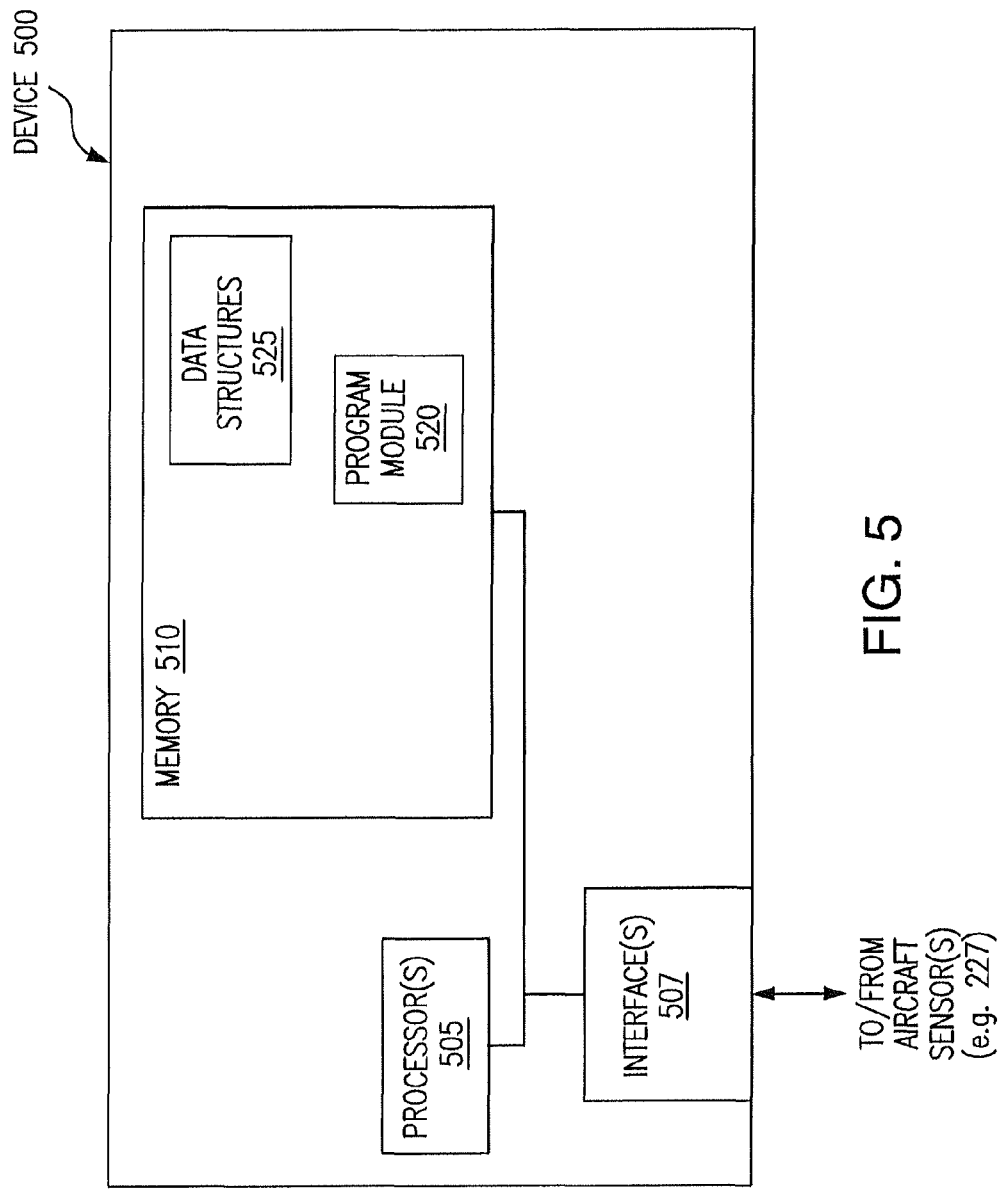
FIG. 5 is an exemplary block diagram of a device for employment of systems and methods of the present disclosure for evaluating a collective alignment of aircraft rotor blades.

FIG. 5 is a block diagram of a device 500, for employment of systems and methods that evaluate the collective alignment main rotor blades, of the present disclosure. Device 500 can be employed as part of HUMS 225, or, alternatively, as a separate stand-alone device.

Device 500 is coupled to aircraft sensors, e.g., sensors 227, via an interface 507. Interface 507 includes mechanical, electrical, and signaling circuitry for communicating data to and from aircraft sensors. Device 500 further includes a processor 505 in communication with a memory 510 having a program module 520. Processor 505 can include one or more programmable processors, e.g., microprocessors or microcontrollers, or fixed-logic processors. In the case of a programmable processor, any associated memory, e.g., memory 510, may be any type of tangible processor readable memory, e.g., random access, read-only, etc., that is encoded with or stores instructions that can implement program module 520. Processor 505 can also include a fixed-logic processing device, such as an application specific integrated circuit (ASIC) or a digital signal processor that is configured with firmware comprised of instructions or logic that can cause the processor to perform the functions described herein. Thus, program module 520 may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein. Moreover, program module 520 is programmed to include instructions for evaluating the collective alignment, which is further described in FIGS. 7-9 discussed below.

Figure 6:
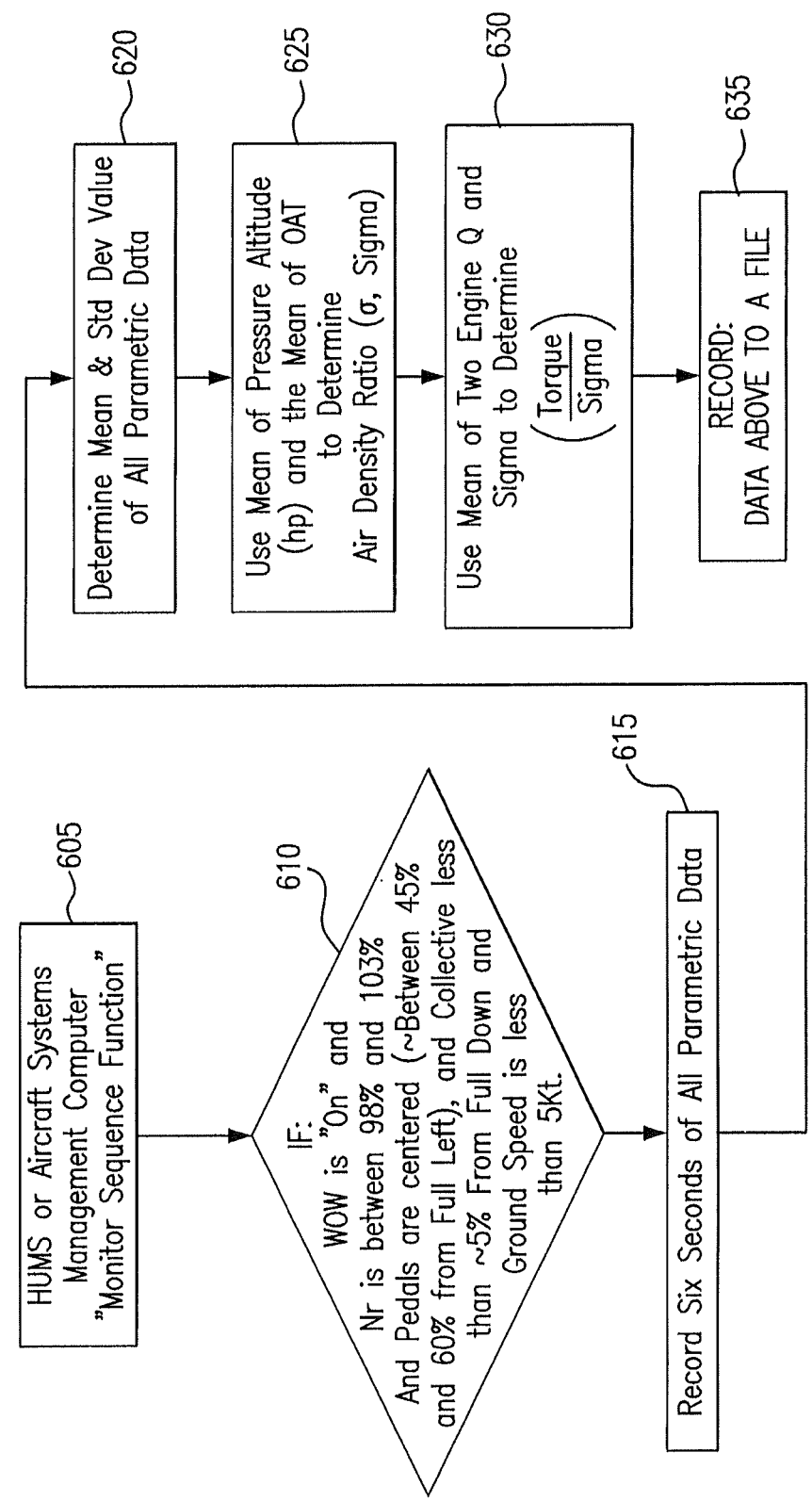
FIGS. 6-7 are flow diagrams that illustrates an exemplary process for evaluating a collective condition; and These and other aspects of the systems and methods of the present disclosure will become more readily apparent to those having ordinary skill in the art from the following detailed description taken in conjunction with the drawings, described above.
Figure 7:
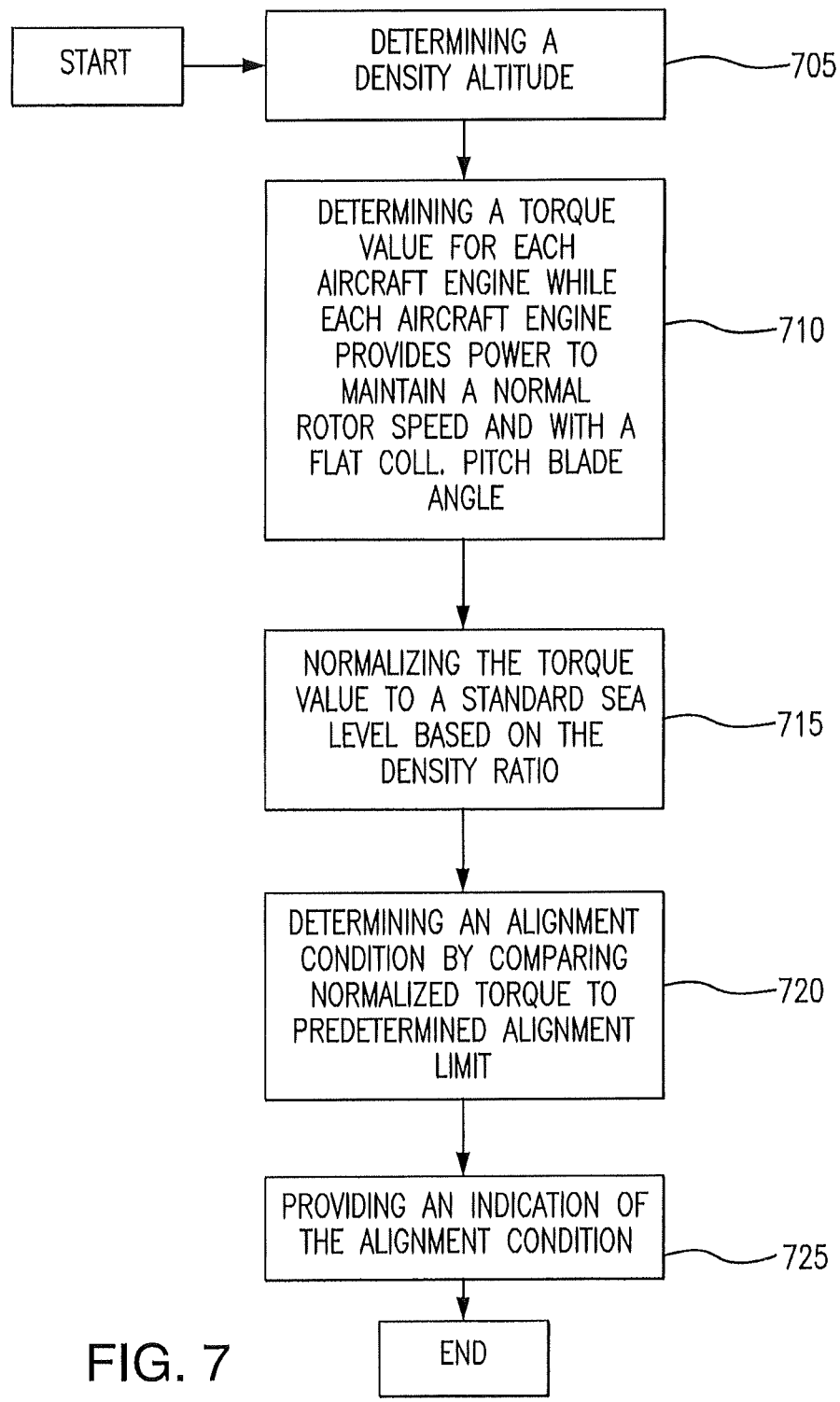

FIGS. 6-7 are diagrams that illustrate a process for evaluating a collective condition. In particular, FIG. 6 provides a process 600, which can be initiated at step 605 by device 500 (either as part of HUMS 227 or as an independent aircraft systems management computer).

At step 610, sensor data from the aircraft is recorded to ensure the aircraft is in proper condition for engine torque measurements. For example, the aircraft is on the ground with the collective in a full down or a collective flat pitch blade angle position, e.g., the collective controller is less than 5% from a full down position. A full down position is referred to as a "flat pitch" blade angle position, whereby the collective blade angle is adjusted to 90 degrees relative to the ground. In addition, the Weight on Wheels (WOW) is "on" and indicates that the aircraft is on the ground. Typically, rotor speed is measured as a percentage of nominal operating RPM for the aircraft (usually established by the aircraft manufacturer). Notably, the rotor speed can exceed 100%. In addition, typically the rotor speed (Nr) is "normal" or between about 98%-about 103% of the ideal rotor speed, the pedal controller position is neutral position, e.g., between about 45% and about 60% from full left, and the ground speed is measured at less than approximately 5 knots. As can be appreciated by those in the art, each of these criteria can be slightly modified without deviating from the spirit and scope of this disclosure.

At step 615, all parametric data is recorded for a period of time, e.g., six seconds, and, at step 620, a mean and a standard deviation for all the parametric data collected is determined. This parametric data includes, but is not limited to the pressure altitude, the outside air temperature and engine torque values (Q) for each aircraft engine. The specific amount of time that the parametric data is recorded is adjusted to minimize scatter or variance due to ambient factors. That is, for very brief intervals of time, ambient factors (e.g., high wind discussed above) can influence engine torque values. To minimize the impact of these ambient factors the amount of time can be increased or decreased or, alternatively, the amount of time can be separated into intervals of time whereby data is recorded followed by intervals whereby data is not recorded. For example, the total amount of time may be for a minute, with each second of parametric data being recorded once every ten seconds.

At step 625, the air density ratio ($\sigma$) is determined based on the mean pressure altitude ($h_p$) and the mean outside air temperature (OAT) and, at step 630, a normalized engine torque value is determined based on the air density ratio. This normalized engine torque value also accounts for the number of aircraft engines. For example, the normalized engine torque value is determined by averaging the mean engine torque value for each engine, e.g., adding the mean engine torque value for each engine and dividing by the number of engines, and, subsequently, dividing the resultant value by the air density ratio. In step 635, this normalized engine torque value is subsequently stored for further analysis, e.g., comparison to threshold limits, or long-term aircraft monitoring.

Referring now to FIG. 7, which displays an alternative process 700 for evaluating a collective condition. Process 700 can be initiated at "start" by device 600 (either as part of HUMS 227 or as an independent aircraft systems management computer). From "start", process 700 progresses to step 705. At step 705, an air density ratio is determined as a function of the air temperature and pressure altitude (discussed above). At step 710, an engine torque value is determined for each aircraft engine while each aircraft engine provides power to maintain a normal operational rotor speed, e.g., rotor speed between about 98% and about 103%. In addition, the rotor blades are positioned in a collective flat pitch angle. At step 715, the engine torque value is normalized to a Standard Sea Level based on the density ratio, determined in step 705. At step 720, the collective condition is evaluated by comparing the normalized engine torque value to predetermined alignment limits. These alignment limits, as discussed with reference to FIGS. 3-4, can include a low engine torque limit, a high engine torque limit, and even an ideal alignment. At step 725, an indication of the collective condition is provided. This indication can be provided to aircraft personnel such as pilots, maintenance crew, or ground towers. The indication can further include displaying the collective condition, e.g., aligned or misaligned or proper or improper, on an electronic display such as a cockpit display.

Alternatively, a diagram such as, but not limited to, diagrams 300 and 400, can be provided for a manual comparison of engine torque to air density altitude to indicate a collective condition. In some embodiments, the air density altitude can be determined by a ground tower or other source. Accordingly, the steps to determine air density altitude can include receiving the air density altitude from the ground tower or other source. In other embodiments, the alignment limits, e.g., the engine torque limits (including the ideal), can be expanded to provide finer detail of the exact collective condition. For example, there may be multiple high or low engine torque limits, which can be associated with specific aircraft performance characteristics.

Ultimately, the collective condition that indicates the pitch blade angles are misaligned requires corrective action. This corrective action can include adjusting pitch control rods that connect each rotor blade to an aircraft swash plate. The aircraft swash plate translates input via the helicopter flight controls, e.g., cyclic controller 230 and collective controller 235 (ref. FIG. 2), into motion of the main rotor blades via a series of pushrods or pitch rods. Each pitch rod typically includes an adjustment control feature that can be turned clockwise or counterclockwise to adjust the collective pitch angle of the main rotor blades. Turning the adjustment feature modifies the collective pitch angle of the main rotor blades, which, adjusts the engine torque. The corrective action can include turning the adjustment feature for each pitch rod until the measured engine torque is within predetermined limits. In addition, stops for the collective controller can be adjusted (which will also adjust the collective control rigging).

The present disclosure emphasizes an application of systems and processes for evaluating a collective condition for rotary aircraft. These systems and processes, as noted above, can be adapted for various aircraft configurations by determining thresholds specific to each of the various aircraft. These systems and methods provide a simplified detection of a collective rotor blade alignment, without the need for any special flight test, e.g., while the aircraft is on the ground.

The disclosed embodiments are merely examples of ways in which certain aspects of the disclosed systems and methods can be implemented and do not represent an exhaustive list of all of the ways the invention may be embodied. Indeed, it will be understood that the systems, devices, and methods described herein may be embodied in various and alternative forms. The figures, described above, are not necessarily to scale and some features may be exaggerated or minimized to show details of particular components. Well-known components, materials or methods are not necessarily described in great detail in order to avoid obscuring the present disclosure. Moreover, the figures illustrate some elements that are known and will be recognized by one skilled in the art. The detailed descriptions of such elements are not necessary to an understanding of the disclosure, and accordingly, are presented only to the degree necessary to facilitate an understanding of the novel features of the present disclosure.

Although the system and methods of the present disclosure have been described with respect to the exemplary embodiments above, those skilled in the art will readily appreciate that changes and modifications may be made thereto without departing from the spirit and scope of this disclosure as defined by the appended claims.

TABLE 1

| 1962 US/ICAO STANDARD ATMOSPHERE | | | | | | | |
|---|---|---|---|---|---|---|---|
| H Geopotential Altitude ft | Θ Temperature Ratio | T Standard Temperature Deg C. | δ Pressure Ratio | P Standard Pressure in Hg | σ Density Ratio | ρ Standard Density slug/ft$^3$ | α Speed of Sound kn |
| 5000 | 0.96562 | 5.09 | 0.83204 | 24.89 | 0.86166 | 0.0020481 | 650.0 |
| 5020 | 0.96548 | 5.05 | 0.83141 | 24.88 | 0.86114 | 0.0020468 | 650.0 |
| 5040 | 0.96535 | 5.02 | 0.83082 | 24.86 | 0.86064 | 0.0020457 | 649.9 |
| 5060 | 0.96521 | 4.98 | 0.83018 | 24.84 | 0.86010 | 0.0020444 | 649.9 |
| 5080 | 0.96507 | 4.93 | 0.82955 | 24.82 | 0.85957 | 0.0020431 | 649.8 |
| 5100 | 0.96493 | 4.89 | 0.82892 | 24.80 | 0.85905 | 0.0020419 | 649.8 |
| 5120 | 0.96480 | 4.86 | 0.82833 | 24.78 | 0.85855 | 0.0020407 | 649.7 |
| 5140 | 0.96466 | 4.82 | 0.82770 | 24.76 | 0.85802 | 0.0020394 | 649.7 |
| 5160 | 0.96452 | 4.78 | 0.82707 | 24.75 | 0.85749 | 0.0020382 | 649.6 |
| 5180 | 0.96438 | 4.74 | 0.82644 | 24.73 | 0.85697 | 0.0020369 | 649.6 |
| 5200 | 0.96425 | 4.70 | 0.82585 | 24.71 | 0.85647 | 0.0020357 | 649.6 |
| 5220 | 0.96411 | 4.66 | 0.82522 | 24.69 | 0.85594 | 0.0020345 | 649.5 |
| 5240 | 0.96397 | 4.62 | 0.82459 | 24.67 | 0.85541 | 0.0020332 | 649.5 |
| 5260 | 0.96383 | 4.58 | 0.82396 | 24.65 | 0.85488 | 0.0020320 | 649.4 |
| 5280 | 0.96370 | 4.54 | 0.82338 | 24.64 | 0.85439 | 0.0020308 | 649.4 |
| 5300 | 0.96356 | 4.50 | 0.82275 | 24.62 | 0.85386 | 0.0020295 | 649.3 |
| 5320 | 0.96342 | 4.46 | 0.82212 | 24.60 | 0.85333 | 0.0020283 | 649.3 |
| 5340 | 0.96328 | 4.42 | 0.82150 | 24.58 | 0.85282 | 0.0020271 | 649.2 |
| 5360 | 0.96315 | 4.38 | 0.82091 | 24.56 | 0.85232 | 0.0020259 | 649.2 |
| 5380 | 0.96301 | 4.34 | 0.82029 | 24.54 | 0.85180 | 0.0020246 | 649.1 |
| 5400 | 0.96287 | 4.30 | 0.81966 | 24.52 | 0.85127 | 0.0020234 | 649.1 |
| 5420 | 0.96273 | 4.26 | 0.81903 | 24.51 | 0.85074 | 0.0020221 | 649.0 |
| 5440 | 0.96260 | 4.22 | 0.81845 | 24.49 | 0.85025 | 0.0020210 | 649.0 |
| 5460 | 0.96246 | 4.18 | 0.81783 | 24.47 | 0.84973 | 0.0020197 | 648.9 |
| 5480 | 0.96232 | 4.14 | 0.81720 | 24.45 | 0.84920 | 0.0020185 | 648.9 |
| 5500 | 0.96218 | 4.10 | 0.81658 | 24.43 | 0.84868 | 0.0020172 | 648.9 |
| 5520 | 0.96205 | 4.06 | 0.81600 | 24.41 | 0.84819 | 0.0020161 | 648.8 |
| 5540 | 0.96191 | 4.02 | 0.81537 | 24.40 | 0.84766 | 0.0020148 | 648.8 |
| 5560 | 0.96177 | 3.98 | 0.81475 | 24.38 | 0.84714 | 0.0020136 | 648.7 |
| 5580 | 0.96163 | 3.94 | 0.81413 | 24.36 | 0.84661 | 0.0020123 | 648.7 |
| 5600 | 0.96150 | 3.91 | 0.81355 | 24.34 | 0.84613 | 0.0020112 | 648.6 |
| 5620 | 0.96136 | 3.87 | 0.81293 | 24.32 | 0.84560 | 0.0020099 | 648.6 |
| 5640 | 0.96122 | 3.83 | 0.81230 | 24.30 | 0.84507 | 0.0020086 | 648.5 |
| 5660 | 0.96108 | 3.79 | 0.81168 | 24.29 | 0.84455 | 0.0020074 | 648.5 |
| 5680 | 0.96095 | 3.75 | 0.81111 | 24.27 | 0.84407 | 0.0020063 | 648.4 |

What is claimed is:

1. A computer-implemented method for evaluating alignment of aircraft rotor blades via a collective condition, while the aircraft is on the ground, the method comprising:

determining, by a computer processor, an air density altitude based on a location of the aircraft;

determining, by the computer processor, a torque value for each engine of the aircraft, while the aircraft rotor blades are operated at a normal speed and the rotor blades are set to a full down position via a collective controller;

evaluating, by the computer processor, the collective condition of the aircraft rotor blades by comparing the torque value to at least one predetermined flat pitch torque alignment limit for the air density altitude; and providing, by the computer processor, an indication of the collective condition.

2. The method of claim 1, wherein the at least one predetermined flat pitch torque alignment for the air density altitude includes a high torque limit, wherein, the step of evaluating the collective condition further comprises:

determining, by the computer processor, a density ratio for the air density altitude;

determining, by the computer processor, a high alignment limit by multiplying the density ratio by about 22, and wherein, the step of providing the indication of the collective condition includes providing the indication of the collective condition based on a comparison of the torque value to the high torque limit.

3. The method of claim 1, wherein the at least one predetermined flat pitch torque alignment for the air density altitude includes a low torque limit, wherein, the step of evaluating the collective condition further comprises:

determining a density ratio for the air density altitude;

determining the low torque limit by multiplying the density ratio by about 17; and wherein, the step of providing the indication of the collective condition includes providing the indication of the collective condition based on a comparison of the torque value to the low torque limit.

4. The method of claim 1, wherein the step of providing the indication of the collective condition includes displaying the collective condition on an aircraft display provided in an aircraft cockpit.

5. The method of claim 1, further comprising the step of:

measuring a neutral aircraft pedal controller position for an aircraft pedal controller, prior to the step of evaluating the collective condition.

6. The method of claim 1, further comprising the steps of:

determining an outside air temperature for the aircraft;

determining an air density ratio based, at least in part, on the outside air temperature; and normalizing the torque value to a standard sea level based on the density ratio.

7. A device for evaluating a collective condition of aircraft rotor blades, while the aircraft is on the ground, the device comprising: a processor; and a memory that contains instructions that are readable by the processor and cause the processor to: determine an air density altitude based on a location of the aircraft; determine a torque value for each engine of the aircraft while the aircraft rotor blades are operated at a normal speed and a collective controller of the aircraft is set to a full down position for ground operations; evaluate the collective condition of the aircraft rotor blades by comparing the torque value to at least one predetermined flat pitch torque alignment limit for the air density altitude; and provide an indication of the collective condition.

8. A non-transitory storage medium comprising instructions that are readable by a processor and cause the processor to: determine an air density altitude for an aircraft on the ground; determine a torque value for each engine of the aircraft, while rotor blades of the aircraft are operated at a normal speed and set to a full down position for ground operations, via a collective controller; evaluate a collective condition based on the torque value and the air density altitude; and provide an indication of the collective condition.

* * * * *